(12) United States Patent
Corsini et al.

(10) Patent No.: US 12,298,740 B2
(45) Date of Patent: May 13, 2025

(54) SYSTEM AND METHOD FOR ASSISTED MODELING OF MANUFACTURING WORKFLOWS

(71) Applicant: Siemens Aktiengesellschaft, Munich (DE)

(72) Inventors: Giorgio Corsini, Genoa (IT); Ornella Tavani, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 538 days.

(21) Appl. No.: 17/704,232

(22) Filed: Mar. 25, 2022

(65) Prior Publication Data

US 2022/0334559 A1  Oct. 20, 2022

(30) Foreign Application Priority Data

Mar. 25, 2021 (EP) .................................... 21164859

(51) Int. Cl.
*G05B 19/4155* (2006.01)

(52) U.S. Cl.
CPC ............ *G05B 19/4155* (2013.01); *G05B 2219/31449* (2013.01)

(58) Field of Classification Search
CPC ...... G05B 19/4155; G05B 2219/31449; G06Q 10/06; G06T 11/60; G06F 9/451; G06N 20/00
See application file for complete search history.

(56) References Cited

U.S. PATENT DOCUMENTS

| | | | |
|---|---|---|---|
| 2008/0065448 A1* | 3/2008 | Hull | G06Q 10/06 705/7.26 |
| 2009/0281865 A1 | 11/2009 | Stoitsev | |
| 2017/0075332 A1* | 3/2017 | Norman | G06F 9/5027 |
| 2020/0184390 A1* | 6/2020 | Askew | G06N 5/01 |

(Continued)

OTHER PUBLICATIONS

Wiegandt, David Luis et al: "Graph n-grams for Scientific Workflow Similarity Search"; Jan. 31, 2016 (Jan. 31, 2016); XP055827071; Retrieved from the Internet: URL:www.researchgate.net/publication/307590266; [retrieved on Jul. 22, 2021].

(Continued)

*Primary Examiner* — Yuhui R Pan
(74) *Attorney, Agent, or Firm* — Laurence A. Greenberg; Werner H. Stemer; Ralph E. Locher

(57) ABSTRACT

A method and system automatically assist in a creation of a manufacturing workflow (WF) for manufacturing a product. The method includes receiving a graphical user input in an editing area configured for creating a manufacturing WF, the graphical user input includes a WF starting node and automatically selecting in a meta-workflow (MWF) library, in response to the received graphical user input and in function of the latter, a MWF. The selected MWF is a graphical pattern starting with the WF starting node and ending with a WF ending node, the latter being connected to each other through a sequence of interconnected decision and/or activity nodes. The selected MWF is displayed in a display box and then in the editing area. A manufacturing WF is created from the MWF displayed in the editing area. An auto-suggestion process is used for associating each node of the MWF to a manufacturing operation.

12 Claims, 3 Drawing Sheets

(56) References Cited

U.S. PATENT DOCUMENTS

2020/0348969 A1\* 11/2020 Grossman ............ G06F 16/9024
2021/0174941 A1\* 6/2021 Mathur ................. H04L 63/102

OTHER PUBLICATIONS

Madhusudan T et al: "A case-based reasoning framework for workflow model management"; Data & Knowledge Engineering, Elsevier BV, NL; vol. 50, No. 1, Jul. 1, 2004 (Jul. 1, 2004), pp. 87-115; XP026976541.

Dijkman Remco et al: "Graph Matching Algorithms for Business Process Model Similarity Search"; Sep. 8, 2009 (Sep. 8, 2009); ICIAP: International Conference on Image Analysis and Processing, 17th International Conference, Naples, Italy, Sep. 9-13, 2013. Proceedings; [Lecture Notes in Computer Science; Lect.Notes Computer], Springer, Berlin, Heidelberg; pp. 48-63; XP047398370.

\* cited by examiner

SYSTEM AND METHOD FOR ASSISTED MODELING OF MANUFACTURING WORKFLOWS

CROSS-REFERENCE TO RELATED APPLICATION

This application claims the priority, under 35 U.S.C. § 119, of European Patent Application EP 21164859.7, filed Mar. 25, 2021; the prior application is herewith incorporated by reference in its entirety.

FIELD AND BACKGROUND OF THE INVENTION

The invention relates to a method and system for assisted modeling of manufacturing workflow. More generally, the present invention relates to Manufacturing Operations Management (MOM) systems.

MOM systems can be defined as "a functional layer of information technology that links business planning and shop floor control systems to deliver to manufacturing an achievable and realistic production plan". While Manufacturing Execution Systems (MES) is mainly focused on the "Production" pillar, MOM is intended to have a broader support of all four categories defined in ISA95, namely Production, Maintenance, Quality, and Inventory.

A typical MOM system consists of a set of applications that must be integrated and coordinated to provide a complete set of MOM functionalities that are required for the target industry.

Workflows are generally used to model and execute plant and business processes, leading to better coordination between people, applications and processes.

MES processes can be very well described through workflows, i.e. diagrams that represent with a precise graphic syntax the set of actions that must be carried out and the relationships between them (action "A" must precede action "B", action "A" can follow action "B" or action "C", etc.). There are formalized workflow standards, for example the one described by the Business Process Model and Notation (BPMN) standard.

Unfortunately, workflows can be large and complex, and their modeling can be time consuming and error prone. Some solutions for helping in the creation of workflows exist. For instance, some are based on an "Autocomplete textual search" that is a predictive, recognition-based mechanism used to assist users in textual searches. An autocomplete search field presents items which match the user textual input as they type. As the user types in more text into the search field, the list of matching items is narrowed down. For graphical modeling of manufacturing workflow, specific industry libraries exist and provide some sets of workflow actions for their specific industry sector.

Therefore, the need still exists for a system and method that enable a user to more intuitively create a workflow.

SUMMARY OF THE INVENTION

An objective of the present invention is therefore to provide a method and a system that are able to assist a user in modeling manufacturing workflows.

This objective is achieved according to the present invention by a method and system for assisted modeling of manufacturing workflows according to the object of the independent claims. Dependent claims present further advantages of the invention.

The present invention proposes to search for similarities within manufacturing workflows and to use the similarities for developing a system capable of assisting or automatically creating workflows. Indeed, the applicant noticed that recurring patterns for similar manufacturing processes in the same industrial or even cross-industry niche can be found. These patterns can act as a guide in a creative process of a manufacturing workflow, so that the system according to the invention can support users creating a new manufacturing workflow by proposing for instance missing steps, or can automatically or semi-automatically complete the definition of manufacturing workflow.

The previously mentioned objective is achieved according to the present invention by a method, preferentially a computer implemented method, for automatically assisting a user in a creation of a manufacturing workflow (hereafter WF) for manufacturing a product. The method including the following steps:

receiving, by the system according to the invention, a graphical user input in an editing area designed for creating a manufacturing WF, wherein the graphical user input includes at least a WF starting node, the WF starting node being optionally connected to at least one first decision or first activity node;

automatically selecting, by the system, in a meta-workflow—hereafter MWF—library, in response to the received graphical user input and in function of the latter, one or several MWF. Wherein each of the selected MWF is a graphical pattern starting with the WF starting node, or optionally with the WF starting node connected to the first decision or activity node, and ending with a WF ending node. The WF starting node and the WF ending node being connected to each other through a series or sequence of interconnected decision and/or activity nodes, each of the selected MWF containing a different series or sequence of the interconnected decision and/or activity nodes, said series or sequence being configured for defining a flow of manufacturing operations from the starting node to the end node;

automatically displaying, by the system, the one or several selected MWF in a display box or area;

receiving, by said system, a selection of one of the displayed MWF;

automatically displaying, by the system, the selected MWF in the editing area; and creating, by the system, a manufacturing WF from the MWF displayed in the editing area. Wherein an auto-suggestion process is used for associating each node of the MWF to a manufacturing operation, wherein for each activity node, a manufacturing operation involving an action is automatically suggested, and for each decision node, a manufacturing operation involving a decision is automatically suggested. The created manufacturing WF is then displayed in said editing area. Preferentially, the created manufacturing WF can automatically be sent by the system according to the invention to a production line or a MES system for triggering a production of a product according to the created manufacturing WF.

According to the present invention, the MWF is an abstracted WF that can be created directly from scratch or derived from an existing WF. According to the present invention, the graphical user input might also enable a user to create a MWF that does not exist yet in the library. The MWF is a WF, substantially, deprived of all detailed elements that make the WF local and particular. The MWF is thus a graphical representation of a real manufacturing WF. The graphical representation is a schema, or structure, or form of an existing real manufacturing WF, but cleansed of any detail specific to the existing manufacturing WF, i.e. free from any detail comprised within the existing WF and related to a specific manufacturing operation that would involve for instance an action with specific resources (equipment, material, and/or personnel). Contrary to a "real" WF, a MWF is therefore not directly executable in a MES or MOM system and needs to be instantiated, i.e. each node of the MWF might be associated to a manufacturing operation. The MWF describes the structure of the workflow.

The present invention proposes to create a MWF library that contains several MWF, wherein each MWF is associated to at least one industrial domain and at least one set of semantic tags. The semantic tags can be used to label the MWF. Some MWF of the library might be created from scratch by a user and stored in the library. Preferentially, a MWF or the library is automatically created by abstracting an existing manufacturing WF of a MES system.

The process of abstracting an existing manufacturing WF from a MES system contains preferentially:

automatically selecting, by the system according to the invention, a manufacturing WF in a MES database. Wherein the manufacturing WF defines a sequence of manufacturing operations involving resources of a manufacture, wherein the sequence of manufacturing operations starts with a first manufacturing operation and ends with a last manufacturing operation, and contains in between a pattern of manufacturing operations configured for defining a flow (i.e. an organized and orchestrated sequence) of the manufacturing operations from the first manufacturing operation to the last manufacturing operation. The manufacturing WF that is used within the MES system represents thus a pattern of manufacturing operations involving resources of the manufacture, like equipment, and/or material, and/or personnel, and the MWF aims to represent the logical structure of this flow abstracted from the manufacturing operations;

automatically determining an industrial domain of the manufacturing WF, and automatically determining a set of semantic tags for the manufacturing WF. In particular, the industrial domain and set of semantic tags can be determined from information provided by the user or from the manufacturing operations comprised within the manufacturing WF, using for instance machine learning techniques;

automatically creating, by the system, a MWF that is a graphical representation of the manufacturing WF, wherein the first manufacturing operation is represented by a starting node, the last manufacturing operation is represented by and end node, and the pattern of manufacturing operations is represented by a sequence of interconnected nodes. Wherein a manufacturing operation involving a decision is represented by a decision node and a manufacturing operation involving an action is represented by an activity node, and the interconnection between all nodes is configured for modeling the pattern of manufacturing operations and said flow;

automatically determining, by the system, whether the MWF, i.e. such a graphical representation, already exists in the MWF library, and if yes, automatically associating to the already existing MWF the industrial domain and the set of semantic tags if not already associated, and optionally storing, for the industrial domain and the set of semantic tags, the manufacturing operation that is associated to each of the nodes of the MWF if not already stored for the concerned node; and if not, storing the MWF in the library and associating to the latter the industrial domain and the set of semantic TAGS, and optionally storing, for the industrial domain and the set of semantic tags, the manufacturing operation that is associated to each of the nodes of the MWF.

The objective of the present invention is also solved by a system, e.g. a computing system, configured for automatically assisting a user in a creation of a manufacturing WF for manufacturing a product, the system containing:

an interface containing an editing area for receiving a graphical user input and a display box or area configured for displaying a set of MWFs;

a MWF library; and a processing unit.

Wherein the processing unit is characterized in that it is configured for performing the steps of the previously described method.

Preferentially, the method according to the invention includes automatically modifying a MWF in response to a modification of the pattern or sequence of manufacturing operations of a manufacturing WF created from the MWF so that the sequence of interconnected nodes of the modified MWF matches the pattern or sequence of manufacturing operations of the modified manufacturing WF, and automatically updating another manufacturing WF that has also been created from the MWF, so that the sequence of interconnected nodes of the modified MWF matches the pattern or sequence of manufacturing operations of the updated another manufacturing WF. Preferentially, the updated another manufacturing WF might be then automatically sent to a MES system for enabling a production according to the updated manufacturing workflow. Thanks to this process, if a user notices that a currently used manufacturing workflow needs to be corrected for any reason, then the user can edit the manufacturing WF in the editing area, and said modification automatically triggers a modification of the MWF from which the manufacturing workflow was created. Optionally any manufacturing WF that was created from the same MWF (i.e. from the version of the MWF before it was modified) is automatically updated for taking into account of said modification. Thanks to this process, the different manufacturing WF used in a MES system might be centrally and automatically corrected or updated.

Finally, the present invention concerns also a non-transitory machine-readable medium storing instructions executable by a processing unit to cause a computing system to perform the steps of the claimed method.

Other features which are considered as characteristic for the invention are set forth in the appended claims.

Although the invention is illustrated and described herein as embodied in a system and a method for assisted modeling of manufacturing workflows, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
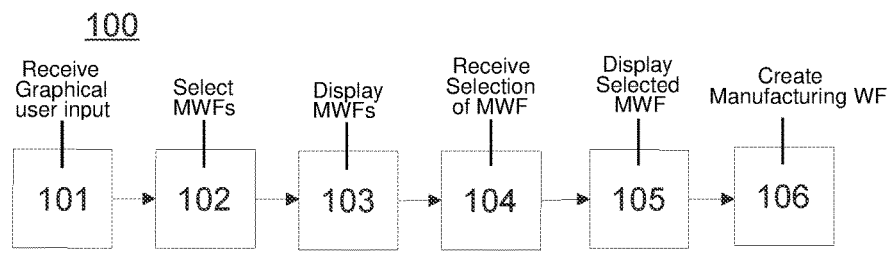
FIG. 1 is a block diagram showing a preferred embodiment of the method according to the invention.

The present invention lays in the technical field of manufacturing execution systems (MES/MOM). FIG. 1 schematically describes the steps of the method according to the invention and FIG. 2 provides a preferred embodiment of a system 200 for automatically assisting a user in a creation of a manufacturing WF according to the invention.

Figure 2:
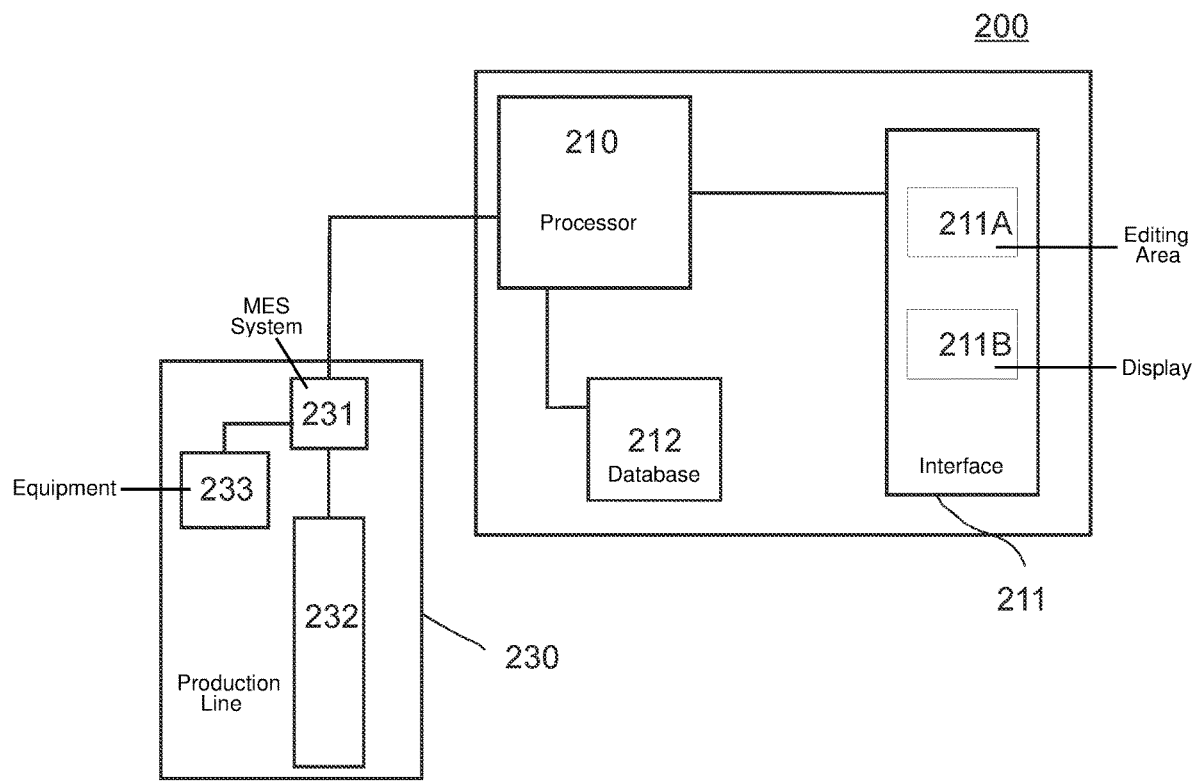
FIG. 2 is a block diagram showing a system for automatically assisting a user in a creation of a manufacturing WF according to the invention.
Figure 3:
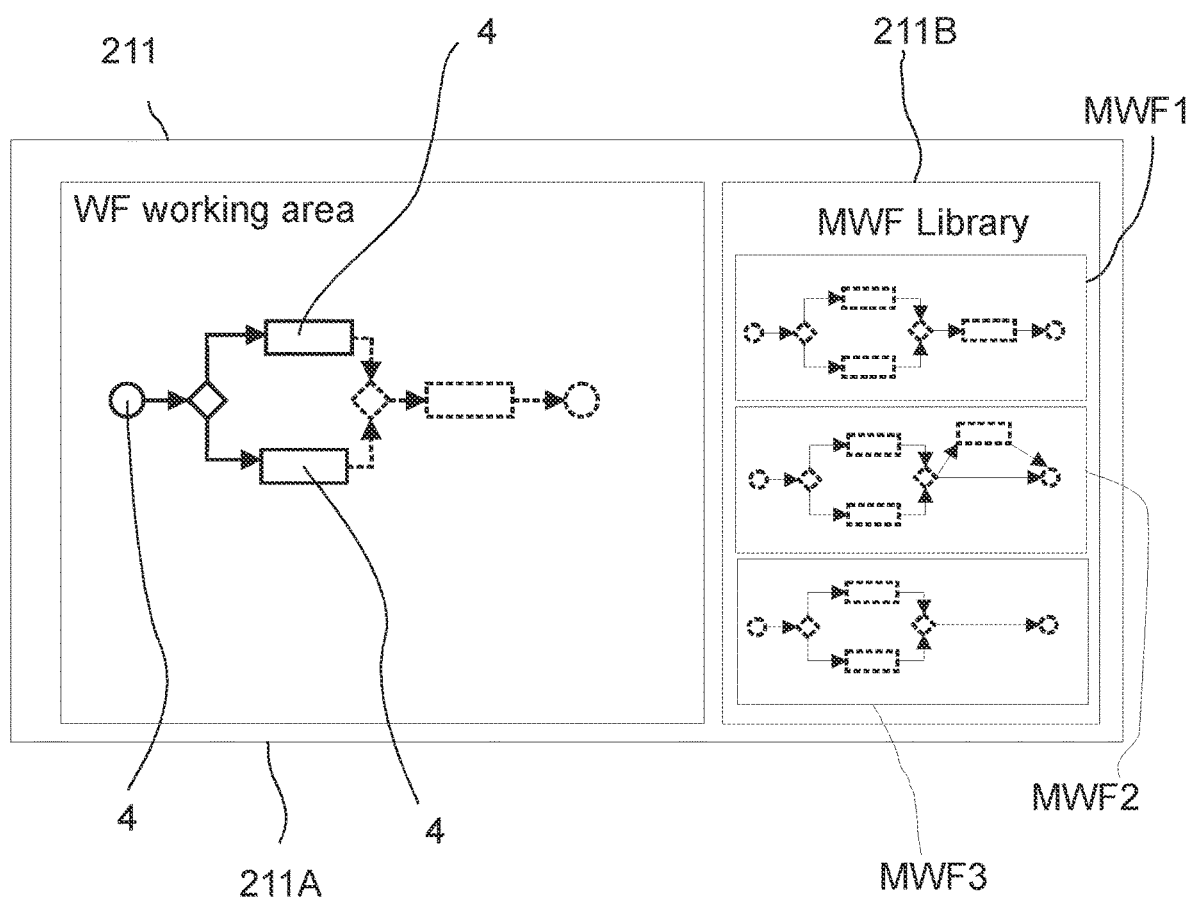
FIG. 3 is an illustration showing a preferred embodiment of an interface according to the invention.

In the example illustrated by FIG. 2, the system 200 according to the invention is typically a computing system and contains a processing unit 210 containing one or several processors and optionally a memory, an interface 211 (e.g. a screen), and a MWF library 212. According to the present invention, the processing unit preferentially contains at least one pattern recognition algorithm for determining a pattern of a manufacturing WF and might be optionally configured for using machine learning techniques, notably for the auto-suggestion process. The interface 211 contains notably an editing area 211A configured for receiving a graphical user input and a display box 211B configured for displaying one or several MWFs and for enabling a user to select one of the displayed MWFs. FIG. 3 illustrates in more details the interface 211. The editing area 211A enables a user to design or create or edit a manufacturing WF by providing a graphical input, for instance nodes 4, and selecting for each node a manufacturing operation which can be suggested to the user by the system according to the invention. The graphical input might be selected by the user in a graphical input list and then added to the editing area 211A using for instance a click and drop functionality of the system according to the invention. The processing unit 210 through its connection to the interface 211 and to the library 212 is able to automatically recognize the graphical inputs of the user in the editing area 211A and is configured for automatically searching MWFs in the library 212 that might correspond to the manufacturing WF in current creation in the editing area. It uses then the display box 211B for displaying one or several MWF, e.g. MWF1, MWF2, MWF3 (see FIG. 3). It provides preferentially in real time suggestions of MWFs for completing the manufacturing WF that is in current creation in the editing area 211. Any change in the editing area 211A might result in a change of the list of MWF displayed in the display box 211B. The suggestions of MWFs in the display box 211B enables the user to select one of the displayed MWF, wherein the system then automatically completes the manufacturing WF so that it becomes identical to the selected MWF. This concept optimizes and speed up the modeling phase of manufacturing WF.

The system 200 might be connected, via its processing unit 210, to a MES system 231 of a production site 230. The production site 230 may comprise one or several production lines 232 as well as other resources for the production of products by the production line 232, like equipment and/or material 233, and personnel. The MES is configured for managing the production of a product by means of the production line 232 and according to a manufacturing workflow defined in a database of the MES system 231.

Figure 4:
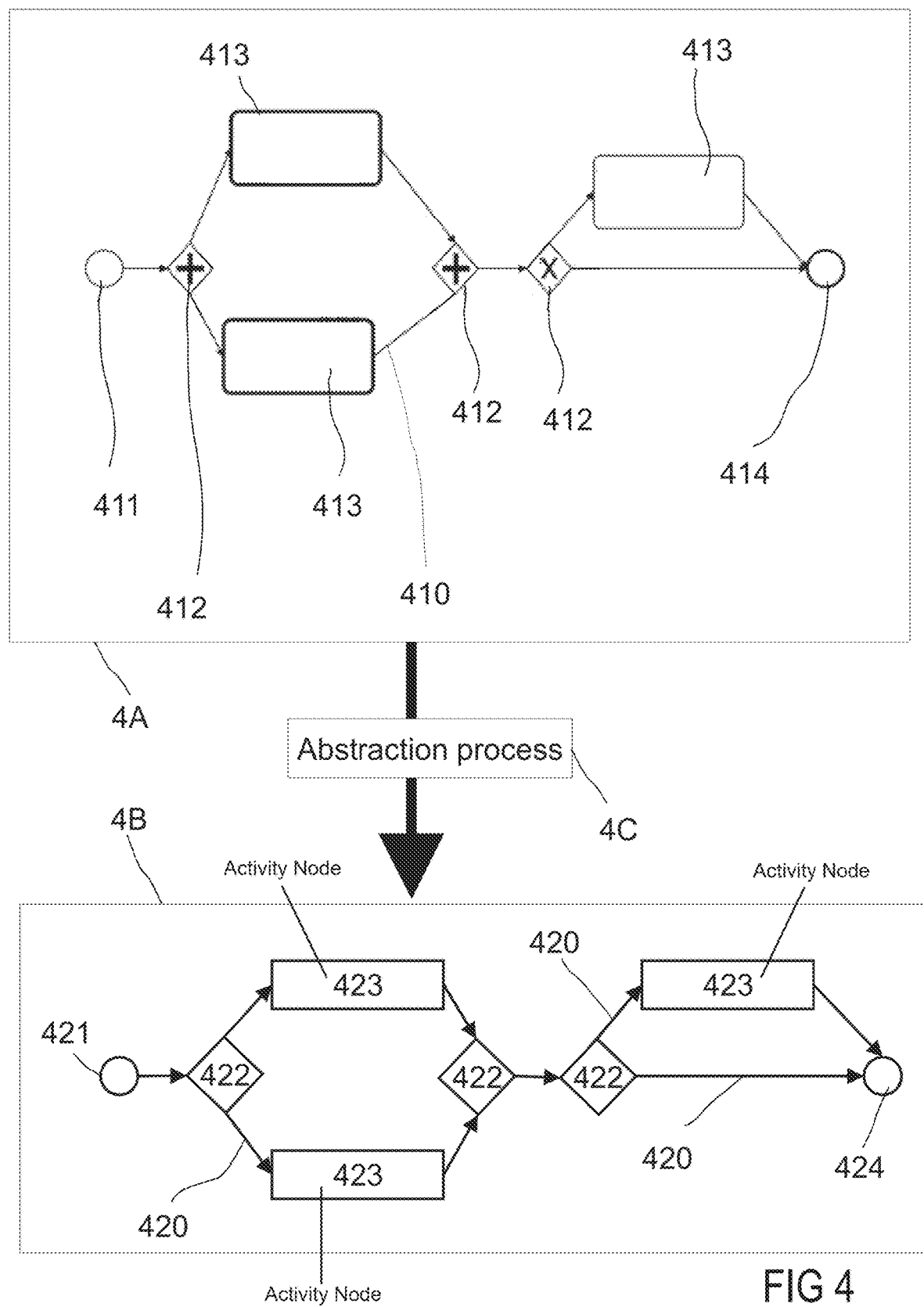
FIG. 4 is an illustration showing an example of a process for abstracting an existing manufacturing WF into an MWF.

Such a manufacturing workflow is presented in box 4A of FIG. 4. A corresponding MWF is presented in box 4B. The present invention proposes to use an abstracting process 4C for abstracting existing manufacturing WFs stored in the database of the MES for automatically creating MWF. FIG. 4 presents a simple example of an abstraction process 4C according to the invention. First, the system according to the invention automatically selects a manufacturing WF in the MES database. A manufacturing WF might also be added in the editing area 211A as input for the abstraction process. As shown in box 4A, the manufacturing WF defines a sequence of manufacturing operations starting with a first manufacturing operation 411 and ending with a last manufacturing operation 414, and containing between the first and last manufacturing operation and connected to the latter a pattern of manufacturing operations containing decisional manufacturing operations 412 and activity manufacturing operation 413, i.e. manufacturing operations involving an action. The different manufacturing operations are connected to each other by arrows 410 describing the flow of manufacturing operations, i.e. the sequence according to which they have to be completed or performed when starting from the first manufacturing operation 411 for reaching the last manufacturing operation 414. The manufacturing workflow is preferentially defined for an industrial domain, e.g. pharma, automotive, etc. The system according to the invention is configured for determining the industrial domain from information related to the workflow and/or from information provided by a user, and to automatically create a set of semantic tags for the manufacturing WF. The semantic tags might be determined from the manufacturing operations of the manufacturing WF, for instance from the used resources.

A result of the abstraction process according to the invention is shown in box 4B. The system according to the invention automatically creates, from a WF of the MES database or from a WF input by a user in the editing area 211A a MWF that is a graphical representation of the existing, real manufacturing WF. For this purpose, the system according to the invention automatically creates a starting node 421 for the first manufacturing operation 411 and an end node 424 for the last manufacturing operation 414. These two nodes are then connected to each other by a pattern of nodes that models the pattern of manufacturing operations of the existing WF. This pattern of nodes is represented by a sequence of interconnected nodes, wherein a decisional manufacturing operation 412 is represented by a decision node 422 and an activity manufacturing operation 413 is represented by an activity node 423. The interconnection between the nodes is represented by the arrows 420 so as to model the pattern of manufacturing operations and the exact flow of manufacturing operations. In other words, the sequence of decision nodes and activity nodes from the starting node to the end node matches the sequence of manufacturing operations from the first manufacturing operation to the last manufacturing operation. The difference between the manufacturing WF and its associated MFW is that the latter is free of an information regarding operations that have to be performed and/or resources that have to be used or decision to be taken. It only comprises the structural and organized sequence of the WF and its logic. At the end, the MFW is stored in the library if it does not already exist.

Indeed, an advantage of the present invention is that MWF defined for a specific industrial domain might be used also for another industrial domain. Therefore, the quantity of data that needs to be stored in the library for representing all possible workflows is strongly decreased. Indeed, the same MWF, i.e. graphical representation, might be used for different industrial applications. Then the implementation of the MWF simply requires an instantiation of each node of the MWF.

For this purpose, the system creates or updates in its library, and at the same time that it proceeds to said abstraction process, and for each node of the MWF, a list of manufacturing operations involving an action for each activity node and a list of manufacturing operations involving a decision for each decision node. In other words, for each node of the MWF, the system is configured for storing the manufacturing operation that corresponds to this node in the manufacturing WF. For a same node, there might be thus different lists of manufacturing operations, each specifically defined for an industrial domain. The user can thus select in the system according to the invention an industrial domain in order to automatically get for each node a list of manufacturing operations that correspond to the selected industrial domain. Such lists of manufacturing operations are then stored in the library for each node of each MWF, and for each industrial domain wherein said MWF can be applied to. Manufacturing operations involving an action are for instance: assembling, testing, painting, soldering, cutting, classifying, imaging, drying, dispatching, packaging, measuring, inspecting, printing, etc. Manufacturing operations involving a decision are for instance: measuring a delay and determining whether the delay is greater or smaller than a predefined value, counting a number of products and determining whether the number is greater or smaller than a predefined number of products, measuring a value for a physical quantity and determining whether it falls within a predefined interval or is greater or smaller than a predefined value, determining whether there is any issue, etc. The decision is related to a yes or no answer, and depending on the answer, the flow of operations will follow a different sequence of subsequent manufacturing operations, e.g. a first sequence if the response is yes, and a second sequence if the response is no.

Turning back to FIG. 1, the latter illustrates in more details a preferred embodiment of the method according to the invention, whose steps are now described.

At step 101, the system 200 according to the invention receives a graphical user input in an editing area 211A. The graphical user input is typically a graphical element, e.g. a node, added to a drawn in editing area 211A. The graphical user input comprises at least a starting node 411. Of course, the user can provide additional graphical elements, i.e. additional nodes, like a connection of the starting node with at least one first decision or first activity node. The graphical user input may further comprise an information regarding an industrial domain and/or a semantic tag in connection with the manufacturing WF to be created.

At step 102, the system 200 automatically selects in the MWF library one or several MWFs. The selection is a function of the received graphical user input, that is, the system automatically determines which MWFs from its library comprises the exact sequence of nodes that are inputted in the editing area by the user. Additionally, and preferentially, if the user provided a semantic tag and/or an industrial domain, the system will automatically limit its search for MWFs to MWFs applying to the semantic tag and/or industrial domain. At the end of the search or determination process, the selected MWFs provided in the display box 211B are characterized by a graphical pattern starting with the graphical user input, i.e. the WF starting node that has been used as input in the editing area, or optionally with the WF starting node connected to the first decision or activity node. The selected MWFs comprise additionally a WF ending node and a sequence of interconnected decision and/or activity nodes connecting the WF starting node to the WF ending node. The different MWFs that have been found by the system in its library present each a different sequence of the interconnected decision and/or activity nodes, making it possible to complete the graphical user input with different sequences of manufacturing operations, and therefore flows of manufacturing operations from the starting node to the end node.

At step 103, the system automatically displays in the display box 211B the MWFs that have been selected or found in the MWF library in response to the graphical user input.

At step 104, the system receives a selection of one of the displayed MWF. Preferentially, the user may select the MWF by clicking on the latter. Optionally, a click and drop process might be implemented, for moving the user selected MWF from the display box to the input boy. In particular, selecting a MWF in the display box automatically shows in the editing area, e.g. in a highlighted manner, the additional nodes that are required for making the sequence of nodes shown in the editing area identical to the sequence of nodes of the selected MWF. If the selection of the MWF is the validated by the user (e.g. using a double click functionality), then the input graphical user is automatically completed.

At step 105, the system automatically displays the selected MWF in the editing area. In other words, as explained previously, the system automatically completes the graphical user input with any additional node that is required for making the sequence of nodes in the editing area identical to the sequence of nodes of the selected MWF. The selected MWF is thus imported in the editing area.

At step 106, the system creates a manufacturing WF from the MWF displayed in the editing area. This creation can be fully automatic, or semi-automatic. It is fully automatic when the system is able to determine all manufacturing operations that have to be associated to each node. For this purpose, the system might use the information provided by the user in the graphical user input, in particular information related to the semantic tag and/or industrial domain for automatically associating to each node manufacturing operations according to the list of manufacturing operations stored in the library. In particular, machine learning techniques might be used for this process. The system might also provide an auto-suggestion process for assisting the user in associating each node of the MWF displayed in the editing area to a manufacturing operation. In this case, a manufacturing operation involving an action is automatically suggested for each activity node, and a manufacturing operation involving a decision is automatically suggested for each decision node. Preferentially, the system displays in the display box the list of manufacturing operations that are associated to each node of the MWF as stored in the library, and, if provided by the user, the displayed list(s) is a function of the industrial domain and/or semantic tag.

The created manufacturing WF can be automatically transferred or sent by the system 200 to the MES system, wherein the latter automatically manages the production of the product according to the received manufacturing WF. Optionally, the system 200 according to the invention comprises or is connected to at least one detection system configured for automatically detecting a manufacturing event (e.g. failure, bottleneck, congestion, etc.) in the production of the product that requires a modification of the manufacturing WF defined for said product. In such a case, in response to the event, the system 200 might be configured for automatically modifying the currently used manufacturing WF that led to the event in function of detection data provided by the detection system. Preferentially, any modification of a manufacturing WF that has been created from a MWW of the library may trigger an automatic modification of the MWF for created a modified MWF, so that the sequence of interconnected nodes of the MWF and the pattern or sequence of manufacturing operations of the modified manufacturing WF matches with each other. Preferably, if a MWF—let's call it "initial MWF"—of the library is modified, e.g. in response to the event or in response to a user modification, the modification resulting in a modified MWF, then the system is configured for automatically modifying any manufacturing WF that has been created from the initial MWF—let's call it "initial manufacturing WF"—, so that the initial manufacturing WF be replaced by a modified manufacturing WF automatically created by the system according to the invention from the modified MWF. The newly created modified manufacturing WF can be automatically sent to the MES system that was using the initial manufacturing WF, wherein it automatically triggers a replacement of the latter by the newly created modified manufacturing WF.

In conclusion, the present invention advantageously provides a system and method capable of assisting a user in the creation of a manufacturing WF. The proposed solution enables to optimize the WF modeling activity, to decrease error in the creation of WF and thus potential failures in the production.

The invention claimed is:

1. A method for automatically assisting a user in a creation of a manufacturing workflow (WF) for manufacturing a product, the method comprises:
  receiving a graphical user input in an editing area configured for creating the manufacturing WF, wherein the graphical user input having at least a WF starting node;
  automatically selecting in a meta-workflow (MWF) library, in response to the graphical user input received and in dependence on the graphical user input, at least one meta-workflow (MWF), wherein the at least one selected MWF is a graphical pattern starting with the WF starting node and ending with a WF ending node, the WF starting node and the WF ending node being connected to each other through a sequence of interconnected decision and/or activity nodes, each of the at least one selected MWF containing a different sequence of the interconnected decision and/or activity nodes, wherein the MWF library being automatically created by abstracting an existing manufacturing WF of a manufacturing execution system (MES system), the abstracting of the existing manufacturing WF from the MES system being performed by the further steps of:
  automatically selecting the manufacturing WF from a MES database, wherein the manufacturing WF defines a sequence of manufacturing operations involving resources of a manufacturer, wherein the sequence of manufacturing operations starts with a first manufacturing operation and ends with a last manufacturing operation, and contains in between a pattern of manufacturing operations configured for defining a flow of the manufacturing operations from the first manufacturing operation to the last manufacturing operation;
  automatically determining an industrial domain of the manufacturing WF, and automatically determining a set of semantic tags for the manufacturing WF;
  automatically creating the MWF that is a graphical representation of the manufacturing WF, wherein the first manufacturing operation is represented by a starting node, the last manufacturing operation is represented by an end node, and the pattern of manufacturing operations is represented by a sequence of interconnected nodes, wherein a manufacturing operation involving a decision is represented by a decision node and a manufacturing operation involving an action is represented by an activity node, and an interconnection between all the nodes is configured for modeling the pattern of manufacturing operations and the workflow;
  automatically determining whether the MWF already exists in the MWF library; and:
    if yes, automatically associating to an already existing MWF the industrial domain and the set of semantic tags if not already associated, and optionally storing, for the industrial domain and the set of semantic tags, the manufacturing operation that is associated to each of the nodes of the MWF if not already stored for a concerned node; and
    if not, storing the MWF in the MWF library and associating to the MWF library the industrial domain and the set of semantic tags, and optionally storing, for the industrial domain and the set of semantic tags, the manufacturing operation that is associated to each of the nodes of the MWF;
  automatically displaying the at least one selected MWF in a display box;
  receiving a selection of the at least one displayed MWF;
  automatically displaying the at least one selected MWF in the editing area; and
  creating the manufacturing WF from the at least one selected MWF displayed in the editing area, wherein an auto-suggestion process is used for associating each node of the at least one MWF to a manufacturing operation, wherein for each said activity node, a manufacturing operation involving an action is automatically suggested, and for each said decision node, a manufacturing operation involving a decision is automatically suggested.

2. The method according to claim 1, wherein the graphical user input contains the industrial domain and/or a semantic tag.

3. The method according to claim 2, wherein the auto-suggestion process includes automatically determining for each said node and from the industrial domain and/or a semantic tag, a list of manufacturing operations involving an action for each said activity node and a list of the manufacturing operations involving a decision for each said decision node, and automatically displaying in the editing area a corresponding list for a user selected node.

4. The method according to claim 2, wherein the MWF library contains several MWFs, wherein each said MWF is associated to at least one said industrial domain and at least one set of semantic tags.

5. The method according to claim 1, which further comprises automatically using a created manufacturing WF in the manufacturing execution system configured for setting up, performing, and monitoring a production of the product according to a created manufacturing WF.

6. A method for automatically assisting a user in a creation of a manufacturing workflow (WF) for manufacturing a product, the method comprises:
  receiving a graphical user input in an editing area configured for creating the manufacturing WF, wherein the graphical user input having at least a WF starting node;
  automatically selecting in a meta-workflow (MWF) library, in response to the graphical user input received and in dependence on the graphical user input, at least one meta-workflow (MWF), wherein the at least one selected MWF is a graphical pattern starting with the WF starting node and ending with a WF ending node, the WF starting node and the WF ending node being connected to each other through a sequence of interconnected decision and/or activity nodes, each of the at least one selected MWF containing a different sequence of the interconnected decision and/or activity nodes;

automatically using a created manufacturing WF in a manufacturing execution system configured for setting up, performing, and monitoring a production of the product according to the created manufacturing WE;

receiving a modification of the created manufacturing WF, and automatically and accordingly modifying the MWF from which the manufacturing WF has been created so that its sequence of interconnected nodes matches the a sequence of manufacturing operations of a modified manufacturing WF, and automatically updating another manufacturing WF that has also been created from the MWF, so that the sequence of manufacturing operations of the updated another manufacturing WF matches the sequence of interconnected nodes of the modified MWF;

automatically displaying the at least one selected MWF in a display box;

receiving a selection of the at least one displayed MWF;

automatically displaying the at least one selected MWF in the editing area; and creating the manufacturing WF from the at least one selected MWF displayed in the editing area, wherein an auto-suggestion process is used for associating each node of the at least one selected MWF to a manufacturing operation, wherein for each activity node, a manufacturing operation involving an action is automatically suggested, and for each decision node, a manufacturing operation involving a decision is automatically suggested.

7. The method according to claim 1, which comprises automatically detecting a manufacturing event in a production of the product that necessitates a modification of a created manufacturing WF defined for the product, and automatically modifying the created manufacturing WF for cancelling the manufacturing event.

8. A system configured for automatically assisting a user in a creation of a manufacturing workflow (WF) for manufacturing a product, the system comprising:
   an interface having an editing area for receiving a graphical user input and a display box configured for displaying a set of meta-workflows (MWFs);
   a meta-workflow (MWF) library; and
   a processor configured for performing the steps of the method according to claim 1.

9. The system according to claim 8, further comprising automatically using a created manufacturing WF in the manufacturing execution system configured for setting up, performing, and monitoring a production of the product according to the created manufacturing WF.

10. A system configured for automatically assisting a user in a creation of a manufacturing workflow (WF) for manufacturing a product, the system comprising:
   an interface having an editing area for receiving a graphical user input and a display box configured for displaying a set of meta-workflows (MWFs);
   a meta-workflow (MWF) library:
   a processor configured for performing the steps of:
      receiving the graphical user input in said editing area configured for creating the manufacturing WF, wherein the graphical user input having at least a WF starting node;
      automatically selecting in said meta-workflow (MWF) library, in response to the graphical user input received and in dependence on the graphical user input, at least one selected meta-workflow (MWF), wherein the at least one selected MWF is a graphical pattern starting with the WF starting node and ending with a WF ending node, the WF starting node and the WF ending node being connected to each other through a sequence of interconnected decision and/or activity nodes, each of the at least one selected MWF containing a different sequence of the interconnected decision and/or activity nodes;
      automatically displaying the at least one selected MWF in said display box:
      receiving a selection of the at least one selected MWF being displayed;
      automatically displaying the at least one selected MWF in the editing area; and
      creating the manufacturing WF from the at least one selected MWF displayed in the editing area, wherein an auto-suggestion process is used for associating each node of the at least one selected MWF to a manufacturing operation, wherein for each activity node, the manufacturing operation involving an action is automatically suggested, and for each decision node, the manufacturing operation involving a decision is automatically suggested; and
   a detection system for automatically detecting a manufacturing event in a production of the product, wherein cancelling the manufacturing event requires a change of the manufacturing WF defined for the product, the system being configured for automatically modifying the manufacturing WF for the product in response to the manufacturing event, for automatically and accordingly modifying a corresponding MWF of the MWF library for creating a modified MWF, and for automatically updating another manufacturing WF used for another production of the product or used for the production of another product, wherein the another manufacturing WF was based on the at least one selected MWF and is updated for matching the modified MWF.

11. The system according to claim 8, wherein the processor has at least one pattern recognition algorithm for determining a pattern of the manufacturing WF.

12. A non-transitory machine-readable medium storing instructions executable by a processor to cause a computing system to:
   receive a graphical user input in an editing area configured for creating a manufacturing work flow (WF), wherein the graphical user input having at least a WF starting node;
   automatically select in a meta-workflow (MWF) library, in response to a received graphical user input and in dependence on the received graphical user input, at least one selected MWFs, wherein the at least one selected MWF is a graphical pattern starting with a WF starting node and ending with a WF ending node, the WF starting node and the WF ending node being connected to each other through a sequence of interconnected decision and/or activity nodes, each of the selected MWF having a different series or sequence of the interconnected decision and/or activity nodes, wherein the MWF library being automatically created by abstracting an existing manufacturing WF of a manufacturing execution system (MES system), the abstracting of the existing manufacturing WF from the MES system being performed by the further steps of:
automatically selecting the manufacturing WF from the MES database, wherein the manufacturing WF defines a sequence of manufacturing operations involving resources of a manufacturer, wherein the sequence of manufacturing operations starts with a first manufacturing operation and ends with a last manufacturing operation, and contains in between a pattern of manufacturing operations configured for defining a flow of the manufacturing operations from the first manufacturing operation to the last manufacturing operation;
automatically determining an industrial domain of the manufacturing WF, and automatically determining a set of semantic tags for the manufacturing WF;
automatically creating a MWF that is a graphical representation of the manufacturing WF, wherein the first manufacturing operation is represented by a starting node, the last manufacturing operation is represented by an end node, and a pattern of manufacturing operations is represented by a sequence of interconnected nodes, wherein a manufacturing operation involving a decision is represented by a decision node and the manufacturing operation involving an action is represented by an activity node, and an interconnection between all nodes is configured for modeling the pattern of manufacturing operations and the workflow;
automatically determining whether the MWF already exists in the MWF library; and:
  if yes, automatically associating to an already existing MWF the industrial domain and the set of semantic tags if not already associated, and optionally storing, for the industrial domain and the set of semantic tags, the manufacturing operation that is associated to each of the nodes of the MWF if not already stored for a concerned node; and
  if not, storing the MWF in the MWF library and associating to the MWF library the industrial domain and the set of semantic tags, and optionally storing, for the industrial domain and the set of semantic tags, the manufacturing operation that is associated to each of the nodes of the MWF;
automatically display the at least one selected MWFs in a display box;
receive a selection of one of the displayed MWF;
automatically display the selected MWF in the editing area; and
create the manufacturing WF from the MWF displayed in the editing area, wherein an auto-suggestion process is used for associating each node of the MWF to a manufacturing operation, wherein for each activity node, a manufacturing operation involving an action is automatically suggested, and for each decision node, a manufacturing operation involving a decision is automatically suggested.

\* \* \* \* \*